United States Patent
Grant et al.

(10) Patent No.: US 9,130,706 B2
(45) Date of Patent: Sep. 8, 2015

(54) METHOD AND APPARATUS FOR SIGNAL QUALITY LOSS COMPENSATION IN MULTIPLEXING TRANSMISSION SYSTEMS

(75) Inventors: Stephen J. Grant, Cary, NC (US); Jung-fu Thomas Cheng, Cary, NC (US); Karl J. Molnar, Cary, NC (US); Yi-Pin Eric Wang, Cary, NC (US); Rajaram Ramesh, Cary, NC (US)

(73) Assignee: Unwired Planet, LLC, Reno, NV (US)

( * ) Notice: Subject to any disclaimer, the term of this patent is extended or adjusted under 35 U.S.C. 154(b) by 2556 days.

(21) Appl. No.: 11/138,724

(22) Filed: May 26, 2005

(65) Prior Publication Data

US 2007/0008943 A1    Jan. 11, 2007

(51) Int. Cl.
| | |
|---|---|
| H04B 7/216 | (2006.01) |
| H04J 9/00 | (2006.01) |
| H04L 1/00 | (2006.01) |
| H04B 7/06 | (2006.01) |
| H04B 17/00 | (2015.01) |
| H04L 1/20 | (2006.01) |
| H04L 1/06 | (2006.01) |

(52) U.S. Cl.
CPC .............. *H04L 1/0026* (2013.01); *H04B 7/061* (2013.01); *H04B 17/0042* (2013.01); *H04L 1/0003* (2013.01); *H04L 1/0009* (2013.01); *H04L 1/0033* (2013.01); *H04L 1/20* (2013.01); *H04B 7/0678* (2013.01); *H04B 7/0691* (2013.01); *H04B 7/0697* (2013.01); *H04L 1/06* (2013.01)

(58) Field of Classification Search
CPC ............................................ H04B 2201/70701
USPC ................. 370/235, 236, 535–538, 522, 224, 370/335–391, 465
See application file for complete search history.

(56) References Cited

U.S. PATENT DOCUMENTS

| | | | |
|---|---|---|---|
| 6,351,499 B1 | 2/2002 | Paulraj et al. | |
| 6,701,129 B1 * | 3/2004 | Hashem et al. | 455/67.11 |

(Continued)

FOREIGN PATENT DOCUMENTS

| | | |
|---|---|---|
| JP | 2002016577 | 1/2002 |
| JP | 2003304188 | 10/2003 |

(Continued)

OTHER PUBLICATIONS

Time Division Multiplex,Jul. 2000.*
Sharif et al., "On the Capacity of MIMO Broadcastr Channel with Partial Side Information", California Institute do Technology, Pasadena, CA, Aug. 30, 2004, 45 pages.

(Continued)

*Primary Examiner* — Samina Choudhry
(74) *Attorney, Agent, or Firm* — Nixon & Vanderhye P.C.

(57) ABSTRACT

A wireless communication receiver receiving a multiplexed signal comprising two or more signal streams calculates a received signal quality for the multiplexed signal as a function of stream-specific received signal qualities, determines one or more loss parameters indicative of variations in the stream-specific received signal qualities, and generates quality feedback based on such information. In turn, a transmitter controls the selection of one or more transmission parameters of the multiplexed signal based on the quality feedback, such that its transmit link adaptations account for the losses in received signal quality at the receiver arising from the variations in the stream-specific received signal qualities. The quality feedback may include calculated loss values, or parameter/penalties that permit loss calculation, and the method applies to both code multiplexing and spatial multiplexing.

51 Claims, 8 Drawing Sheets

(56) References Cited

U.S. PATENT DOCUMENTS

| | | | |
|---|---|---|---|
| 6,785,341 B2 | 8/2004 | Walton et al. | |
| 6,804,312 B1 | 10/2004 | Win et al. | |
| 6,963,553 B1* | 11/2005 | Cordier et al. | 370/342 |
| 7,072,366 B2* | 7/2006 | Parkkinen et al. | 370/538 |
| 7,155,655 B2 | 12/2006 | Cheng | |
| 7,536,198 B1* | 5/2009 | Wu et al. | 455/522 |
| 7,583,968 B2 | 9/2009 | Kimura | |
| 8,515,435 B2 | 8/2013 | Krasny et al. | |
| 2003/0100324 A1 | 5/2003 | Kasapi | |
| 2003/0236080 A1 | 12/2003 | Kadous et al. | |
| 2004/0082356 A1 | 4/2004 | Walton et al. | |
| 2004/0120411 A1 | 6/2004 | Walton et al. | |
| 2004/0136349 A1 | 7/2004 | Walton et al. | |
| 2004/0146018 A1 | 7/2004 | Walton et al. | |
| 2004/0196919 A1 | 10/2004 | Mehta et al. | |
| 2005/0041622 A1 | 2/2005 | Dubuc et al. | |
| 2005/0147177 A1* | 7/2005 | Seo et al. | 375/267 |
| 2005/0259973 A1* | 11/2005 | Yamamoto | 386/111 |
| 2006/0034164 A1* | 2/2006 | Ozluturk | 370/208 |
| 2006/0072514 A1* | 4/2006 | Kent et al. | 370/335 |
| 2006/0217128 A1* | 9/2006 | Chen et al. | 455/456.1 |

FOREIGN PATENT DOCUMENTS

| | | |
|---|---|---|
| JP | 2003333008 | 11/2003 |
| JP | 2005-86304 A | 3/2005 |
| JP | 2005079905 | 3/2005 |
| JP | 2005102136 | 4/2005 |
| JP | 2006238314 | 9/2006 |
| WO | WO 2004/084420 | 9/2004 |
| WO | 2004/098092 | 11/2004 |
| WO | 2005/032154 | 7/2005 |

OTHER PUBLICATIONS

Heath, Jr. et al., "Antenna Selection for Spatial Multiplexing Systems with Linear Receivers", *IEEE Communications Letters*, vol. 5, No. 4, Apr. 2001, pp. 142-144.

3GPP TR 25.876 V1.3.1 (May 2004), "$3^{rd}$ Generation Partnership Project; Technical Specification Group Radio Access Network; Multiple-Input Multiple Output in UTRA".

Foschini et al., "Simplified Processing for High Spectral Efficiency Wireless Communication Employing Multi-Element Arrays", IEEE Journal on Selected Areas in Communications, vol. 17, No. 11, Nov. 1999, pp. 1841-1852.

Cheng, "On the Coding Gain of Incremental Redundancy Over Chase Combining", Globecom, 2003, IEEE, pp. 107-112.

Molnar et al., "Improved Pacet Data Performance for WCDMA Using Multi-Antenna Techniques", IEEE, 2003, pp. 642-646.

Wachsmann et al., "Exploiting the Data-Rate Potential of MIMO Channels: Multi-Stratum Space-Time Coding", IEEE, 2001, pp. 199-203.

Heath, Jr. et al., "Multi-Mode Antenna Selection for Spatial Multiplexing Systems with Linear Receivers".

Gore et al., "Transmit Selection in Spatial Multiplexing Systems", *IEEE Communications Letters*, vol. 6, No. 11, Nov. 2002, pp. 491-493.

Blum et al., "On Optimum MIMO With Antenna Selection", IEEE Communications Letters, vol. 6, No. 8, Aug. 2002, pp. 322-324.

Supplementary European Search Report from EP 06 71 7124, mailed Dec. 8, 2011.

Office Action from JP 2008-513418 mailed Nov. 8, 2011 (with English language summary).

Office Action from JP 2008-513418 mailed Sep. 11, 2012 (with English language summary).

\* cited by examiner

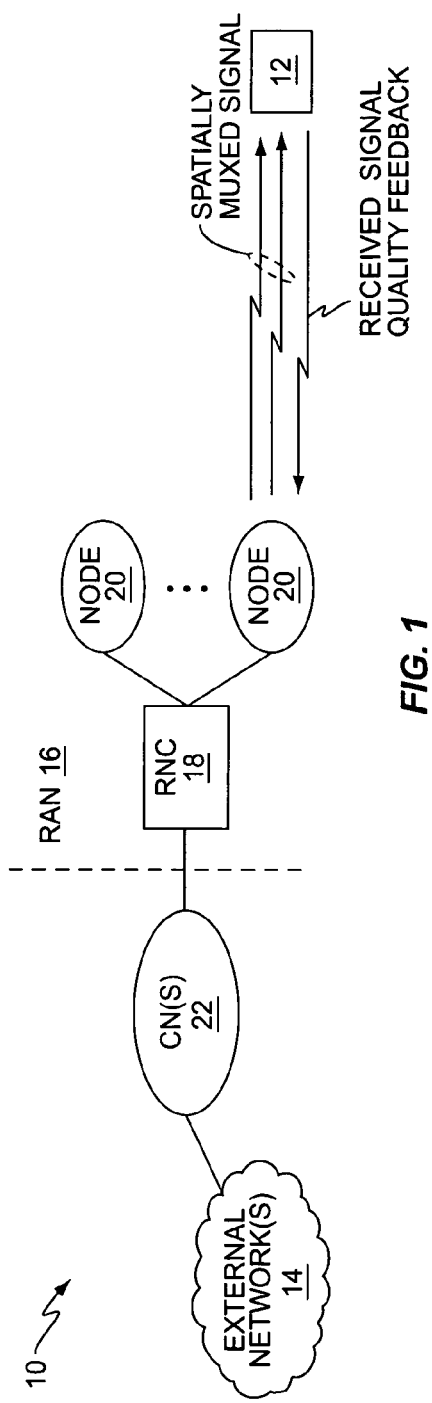
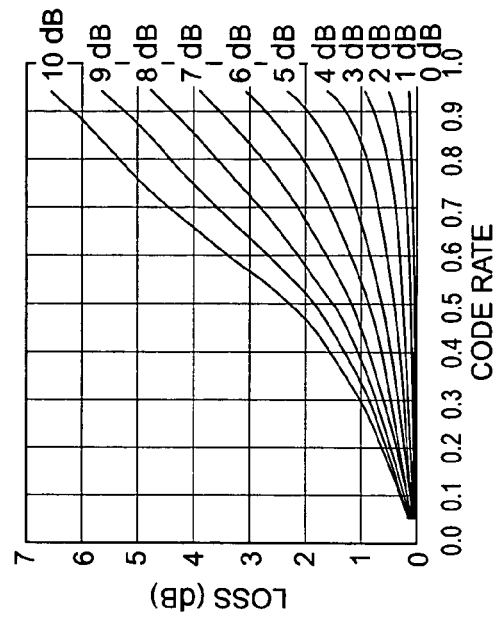
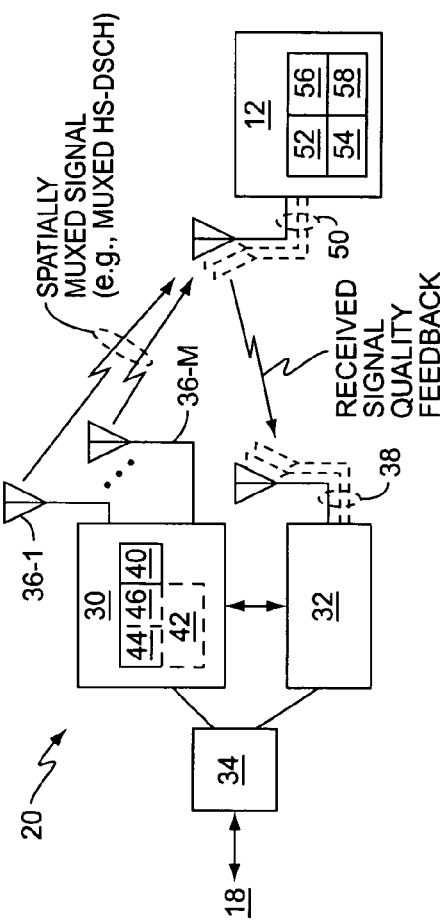
FIG. 1
FIG. 2
FIG. 3

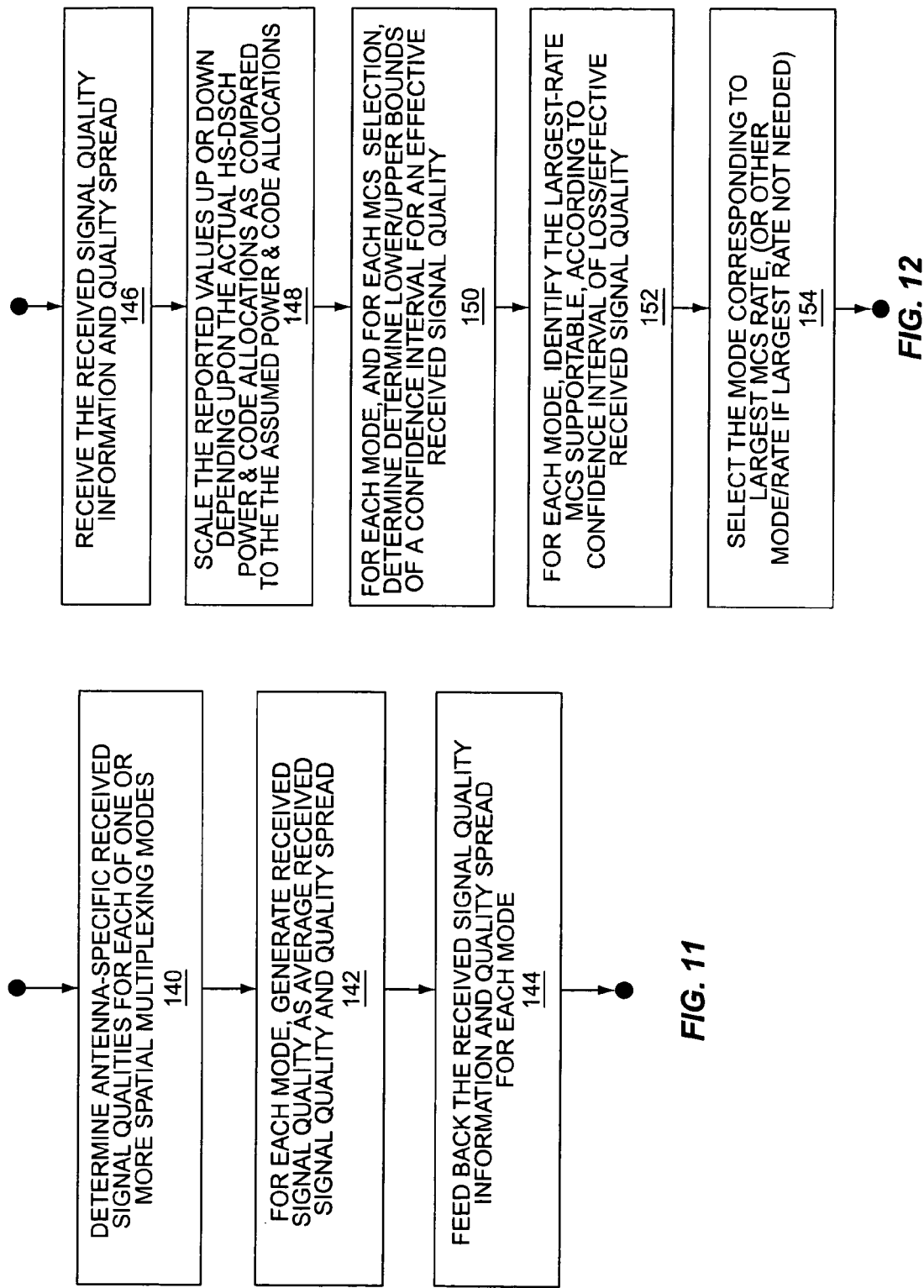

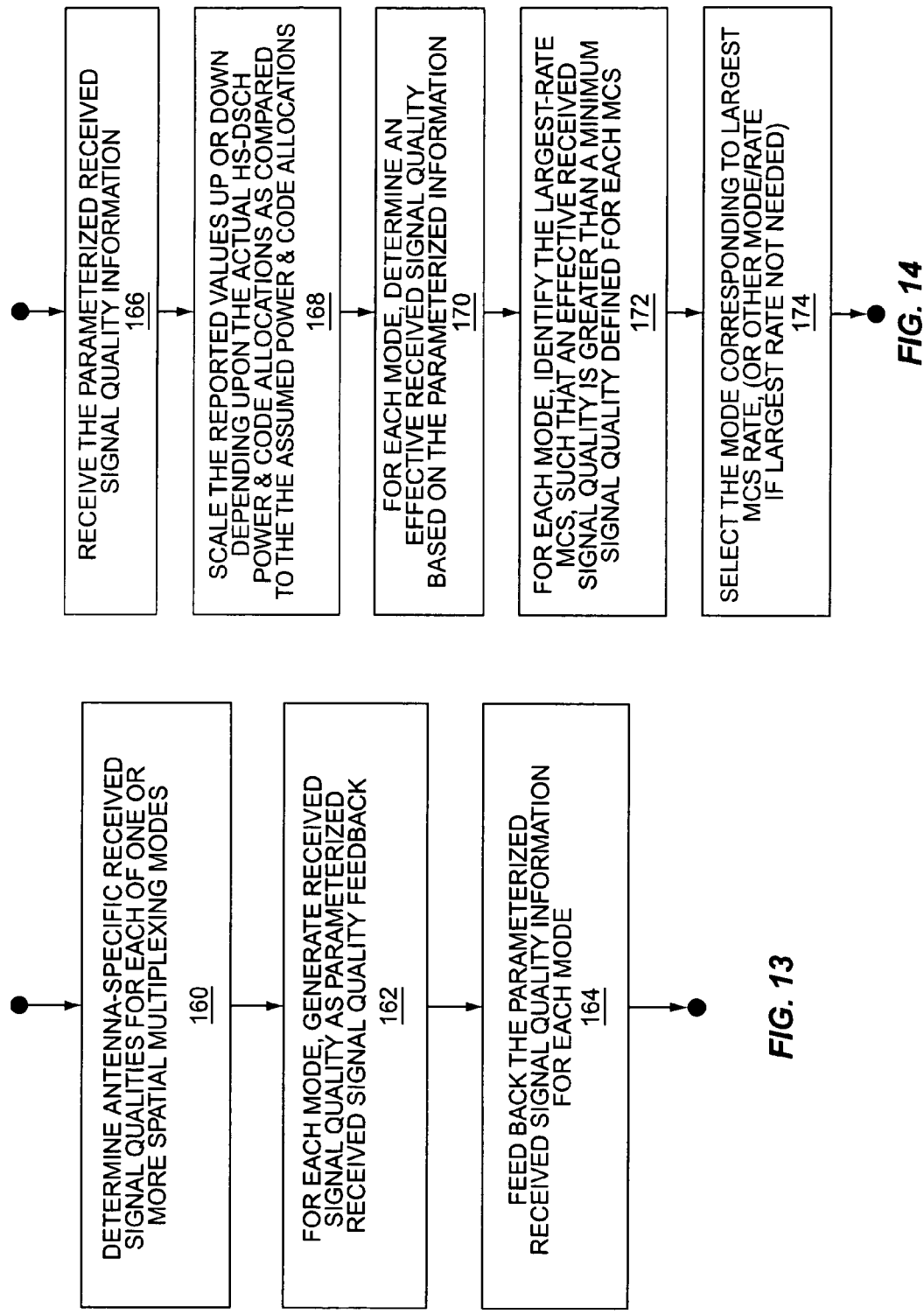

METHOD AND APPARATUS FOR SIGNAL QUALITY LOSS COMPENSATION IN MULTIPLEXING TRANSMISSION SYSTEMS

BACKGROUND OF THE INVENTION

The present invention relates to wireless communication networks, and particularly relates to controlling multiplexed signal transmission parameters responsive to improved received signal quality determination.

It is not uncommon for transmitters in wireless communication networks to perform transmit link adaptation responsive to received signal quality feedback from their targeted receivers. For example, any one or more of the transmit power, coding rate, modulation format, and the like, may be varied for a given receiver as function of the received signal quality reported by that receiver.

The use of received signal quality as a link adaptation control input is common for rate-controlled channels, wherein the network transmitter varies the data rate of a transmitted communication signal, rather than the transmit power of the signal, responsive to reported changes in received signal quality at the targeted receiver(s). The Wideband Code Division Multiple Access (W-CDMA) standards define a rate-controlled signal known as the High Speed Downlink Shared Channel (HS-DSCH). The HS-DSCH is a shared channel that provides high-rate packet data services to a potentially large number of receivers (users) that share the channel in time-multiplexed and/or code-multiplexed fashion.

The HS-DSCH is time-slotted and individual time slots are dedicated to individual users according to a defined scheduling algorithm. Users are scheduled according to service needs and other criteria, but the rate selected for serving a given user on that user's scheduled time slots generally is selected as a function of the received signal quality reported by the user. More particularly, the user reports a channel quality indicator, or some other representation of received signal quality, and the transmitter uses the reported value to determine the highest rate that can be supported by the user at acceptable error rates. Keeping the transmission error rate relatively low improves the overall system efficiency, because excessive data re-transmissions are avoided. Indeed, the effective throughput of the HS-DSCH can fall off quite rapidly if the transmitter selects data rates that are higher than are appropriate for the actual reception conditions at the targeted receivers.

Thus, if one or more of the targeted receivers "over reports" its received signal quality, the transmitter likely will make transmit link adaptations, e.g., the selection of transmit modulation formats and coding rates, that are inappropriate for the actual received signal quality at the misreporting receiver. The adaptation of the HS-DSCH to spatial multiplexing transmitters represents one circumstance where the targeted receivers are likely to report higher-than-actual received signal qualities. Similar over-reporting scenarios arise in code multiplexing transmissions (e.g., "multi-coding"), and in combinations of code multiplexing and spatial multiplexing.

The likelihood of over-reporting signal quality arises as a consequence of multiplexed transmission, such in spatial multiplexing transmissions, wherein code symbols belonging to the same codeword are transmitted as different signal streams and experience different fading and/or interference between the transmitter and the targeted receiver. Consequently, the received signal quality, e.g., the symbol signal-to-noise-plus-interference ratio (SINR), varies across the codeword at the input to the receiver's decoder. As an example, with four signal streams comprising a received multiplexed signal, the receiver experiences four distinct (stream-specific) received signal qualities. These variations in stream-specific received signal qualities give rise to signal quality losses at the receiver. Thus, simply reporting an average of the stream-specific received signal qualities does not provide the transmitter with an accurate "picture" of the true received signal quality at the receiver.

SUMMARY OF THE INVENTION

At least one method taught herein compensates for losses in received signal quality experienced by a receiver receiving a multiplexed signal by controlling the selection of one or more transmission parameters (e.g., coding rate) for the multiplexed signal based at least in part on estimating coding rate-dependent signal quality losses arising at the receiver due to variations in stream-specific received signal qualities of the multiplexed signal. By way of non-limiting example, the method permits modulation and/or coding rate selection for a spatially multiplexed High-Speed Downlink Shared Channel (HS-DSCH) signal in a Wideband Code Division Multiple Access (W-CDMA) network to consider such losses. Of course, the method applies to code multiplexing (e.g., "multi-coding") as well as spatial multiplexing, and to combinations of code and spatial multiplexing.

In another embodiment, a method of compensating for losses in received signal quality experienced by a receiver receiving a multiplexed signal comprises calculating a received signal quality for the multiplexed signal as a function of stream-specific received signal qualities determined for the two or more signal streams of the multiplexed signal, determining a loss in received signal quality as a function of variations in the stream-specific received signal qualities, and controlling one or more transmission parameters of the multiplexed signal as a function of the received signal quality and the loss in received signal quality. The transmission parameter(s), for example, may be a modulation format selection, a coding rate selection, or a combination of modulation format and coding rate.

With the above in mind, a wireless communication receiver may be adapted to receive and process a multiplexed signal comprising multiple signal streams. In one embodiment, such a wireless communication receiver comprises one or more processing circuits configured to calculate a received signal quality for the multiplexed signal as a function of stream-specific received signal qualities determined for the multiplexed signal, determine a loss parameter for the received signal quality as a function of variations in the stream-specific received signal qualities, and generate received signal quality information for feedback based on the received signal quality and the loss parameter.

The receiver may be configured to calculate the received signal quality as a mode-specific received signal quality for each of one or more multiplexing modes defined for the multiplexed signal. Where the receiver determines mode-specific received signal qualities, it may be configured to determine one or more coding rate-dependent loss parameters for each mode-specific received signal quality, based on the variations in the stream-specific received signal qualities of the multiplexed signal in the corresponding multiplexing mode. In such embodiments, the received signal quality information fed back (directly or indirectly) to the multiplexing transmitter comprises mode-specific received signal quality estimates and corresponding loss parameters for each such mode-specific received signal quality estimate. Note that the loss parameters may comprise loss values expressing effective losses in received signal quality, or may comprise values enabling the transmitter to calculate such losses.

Regardless of the particular format adopted for loss parameter feedback, one embodiment of a complementary multiplexing transmitter comprises radio transmission circuits configured to support a method of adapting the transmit link for the multiplexed signal by controlling one or more transmission parameters based on the feedback described above. Such circuits include one or more interface circuits configured to receive feedback from the remote receiver comprising a received signal quality for the multiplexed signal and a loss parameter indicative of variations in stream-specific received signal qualities of the multiplexed signal, and a control circuit configured to control the selection of one or more transmission parameters of the multiplexed signal as a function of the received signal quality and the loss parameter.

The above control circuit may include, or may be associated with, a calculation circuit that is configured to determine an effective received signal quality for the remote receiver based on estimating a loss in received signal quality arising at the remote receiver from the variations in the stream-specific received signal qualities of the multiplexed signal. Where the received signal quality and the loss parameter comprise a received signal quality and one or more loss parameters for each of one or more multiplexing modes associated with the multiplexed signal, the transmitter may evaluate the effective received signal qualities for different coding rates in each multiplexing mode, and select the mode offering the best rate.

However, those skilled in the art should appreciate that the present invention is not limited to the above features and advantages. Indeed, those skilled in the art will recognize additional features and advantages of the present invention upon reading the following detailed description of selected embodiments of the invention, and upon viewing the corresponding drawings.

BRIEF DESCRIPTION OF THE DRAWINGS

FIG. 1 is a block diagram of a wireless communication network and a wireless communication device.

FIG. 2 is a block diagram of function circuit details for embodiments of the transceiver node and wireless communication device illustrated in FIG. 1.

FIG. 3 is a graph of received signal quality loss curves that may be embodied in memory as look-up table values or function values.

FIGS. 11 and 12 are logic flow diagrams for another embodiment of generating received signal feedback at a remote receiver and responding to such feedback at a corresponding spatial multiplexing transmitter, respectively.

FIGS. 13 and 14 are logic flow diagrams for another embodiment of generating received signal feedback at a remote receiver and responding to such feedback at a corresponding spatial multiplexing transmitter, respectively.

DETAILED DESCRIPTION OF THE INVENTION

Figure 4:
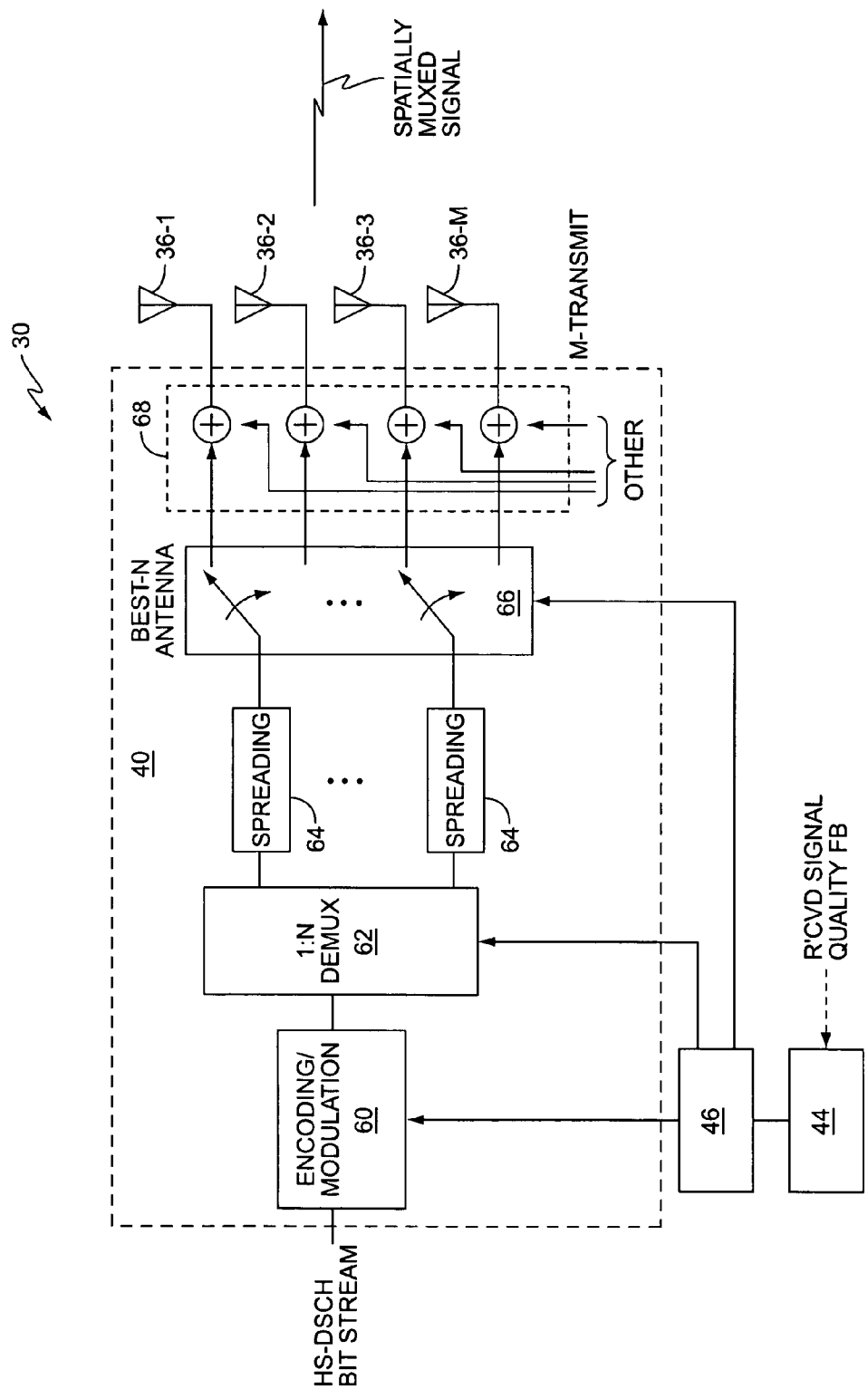
FIG. 4 is a block diagram of a transmitter portion of the transceiver node illustrated in FIG. 1, for example, for a W-CDMA embodiment, wherein a HS-DSCH signal is transmitted as a spatially multiplexed signal.

It should be understood that the methods and corresponding apparatus taught herein apply to code multiplexed signals and/or spatially multiplexed signals. Thus, although at least some of the following discussion is cast within a spatial multiplexing framework, such details are not limiting.

With the above point in mind, FIG. 1 partially illustrates one embodiment of a wireless communication network 10 that communicatively couples a wireless communication device 12 to one or more external networks 14. Supporting such communications, the network 10 comprises a Radio Access Network (RAN) 16 that includes one or more Radio Network Controllers (RNCs) 18, with each RNC 18 controlling one or more transceiver nodes 20 (sometimes referred to as "radio base stations" or "base transceiver stations"). The network 10 further comprises one or more Core Networks (CNs) 22, which provide communication links with the external network(s) 14.

By way of non-limiting example, the wireless communication network 10 may comprise a Wideband Code Division Multiple Access (W-CDMA) network configured to communicatively couple the wireless communication device 12 to the Public Switched Telephone Network (PSTN) and/or the Internet or other Public Data Network. The wireless communication device 12 thus may comprise a mobile station or other type of communication device configured for operation according to the W-CDMA standards. More generally, the wireless communication device 12, which is also referred to as a "remote receiver," or, more generally, simply referred to as a "wireless communication receiver," comprises essentially any type of communication device configured to receive wireless communication signals from a supporting communication network.

In some embodiments, at least one of the transceiver nodes 20 is configured as a code-multiplexing transmitter that is operative to transmit a code-multiplexed signal to the wireless communication device 12. However, according to the illustrated embodiment, at least one of the transceiver nodes 20 is configured as a spatial multiplexing transmitter that is operative to transmit a spatially multiplexed signal to the wireless communication device 12.

In turn, the wireless communication device 12 provides received signal quality feedback for the multiplexed signal, thereby enabling the network 10 (e.g., the transmitter of transceiver node 20) to perform transmit link adaptations based on the received signal quality feedback. More particularly, the wireless communication device 12 is configured to provide received signal quality feedback that reflects variations in the (transmit) stream-specific received signal qualities corresponding to the multiplexed signal, as received by the wireless communication device 12. By providing feedback that explicitly (or implicitly) indicates stream-specific variations in received signal quality, the transmit link adaptations performed for the multiplexed signal may be compensated for the received signal quality losses arising from such variations.

By way of non-limiting example, the wireless communication network 10 may comprise a Wideband Code Division Multiple Access (W-CDMA) network, and transmitter circuitry included within the transceiver node 20 may be configured to transmit a High Speed Downlink Shared Channel (HS-DSCH) signal as the multiplexed signal. Increasing the effective data rate of the channel stands as one advantage of spatially multiplexing the HS-DSCH signal. Complementing this embodiment of the network 10, the wireless communication device(s) 12 may comprise mobile stations, terminals, or other type of wireless communication device that is configured for use in W-CDMA networks.

Of particular interest herein, the wireless communication device 12 is configured to provide received signal quality feedback for a multiplexed signal received by it, wherein that feedback reflects, directly or indirectly, the variations in stream-specific received signal qualities for the multiplexed signal. As noted earlier herein, such variations give rise to a loss in the effective received signal quality. Thus, reflecting the losses in the feedback allows the transmit link adaptations being performed by the network 10 for the multiplexed signal to compensate for the losses. As is detailed herein, the wireless communication device 12 reflects the variations in stream-specific received signal qualities either directly, such as by feeding back the stream-specific received signal qualities or by feeding back parameterized variation information, or indirectly, such as by feeding back an effective received signal quality that already is compensated for the variations.

FIG. 2 illustrates embodiments of the transceiver node 20 and the wireless communication device 12 that support direct or indirect feedback of the variations and corresponding transmit link adaptations. The transceiver node 20 comprises a transmitter 30, a receiver 32, an RNC interface circuit 34, a plurality of transmit antennas 36-1 through 36-M, and one or more receiver antennas 38.

The transmitter 30 comprises a spatial multiplexing transmitter comprising radio transmission circuits 40 configured to transmit a multiplexed signal from the multiplexing transmitter to a remote receiver (e.g., the wireless communication device 12), and one or more interface circuits 42 configured to receive feedback from the remote receiver that reflects variations in stream-specific received signal qualities as calculated by the remote receiver for the multiplexed signal. These stream-specific variations relate to the individual ones of the transmit antennas 36 being used to transmit the multiplexed signal to the wireless communication device 12.

The transmitter 30 further comprises a calculation circuit 44 configured to determine an effective received signal quality for the remote receiver based on estimating a loss in received signal quality arising at the remote receiver because of said variations in stream-specific received signal qualities, and a transmit link adaptation control circuit 46 configured to adapt the transmit link (for the multiplexed signal) by controlling one or more transmission parameters of the multiplexed signal as a function of the effective received signal quality.

In the illustration, the wireless communication device 12 comprises a wireless communication receiver configured to enable a spatial multiplexing transmitter (e.g., the transmitter 30 of the transceiver node 20) to compensate transmit link adaptations for received signal quality losses arising at the receiver because of variations in stream-specific received signal qualities. To that end, the wireless communication device 12 comprises one or more receive/transmit antennas 50, a receiver circuit 52, a transmitter circuit 54, and one or more (baseband) processing circuits 56 that include, or are associated with, a calculation circuit 58.

The calculation circuit 58 is configured to calculate stream-specific received signal qualities for a multiplexed signal transmitted from the spatial multiplexing transmitter to the wireless communication device 12, and to generate received signal quality feedback that reflects variations in the stream-specific received signal qualities, for return to the spatial multiplexing transmitter. Thus, the transmitter 30 of the transceiver node 20 transmits a multiplexed signal to the wireless communication device 12, and the calculation circuit 58 of the wireless communication device 12 generates received signal quality feedback that reflects (transmit) stream-specific variations in the received signal qualities for the multiplexed signal, for return to the transmitter 30.

By reflecting such variations in the feedback, the transmit link adaptations performed by the transceiver node 20 for the multiplexed signal being transmitted to the wireless communication device 12 can be compensated for the losses arising from the variations. FIG. 3 illustrates a typical set of loss curves associated with such variations, wherein each curve in the diagram plots the loss in effective received signal quality as a function of the transmit coding rate and the magnitude of the variations in dBs. For example, one sees from the diagram that for a coding rate of 0.9 and with a 9 dB variation in the stream-specific received signal qualities, the wireless communication device 12 suffers a loss in effective received signal quality of about 5 dB. Of course, it should be understood that FIG. 3 is merely illustrative, and that the loss curves applicable to any particular design scenario will vary.

FIG. 4 illustrates one scenario, depicting an embodiment of the transmitter 30 for use in a W-CDMA implementation of the transceiver 20. The transmitter (radio) resources comprise a modulator/encoder 60, a 1:N demultiplexer 62, a plurality of spreading circuits 64, a "best-N" transmit antenna selector 66, and a plurality of summing circuits 68.

The (spatially) multiplexed signal, formed as a set of individually spread substreams is transmitted from the N selected antennas, as selected by the transmit antenna selector 66 from the set of M transmit antennas 36, via the combining circuits 68, which provide composite signals to the transmit antennas 36, representing the substreams of the multiplexed signal and one or more "other" signals. Commonly, these other signals comprise pilot signals, control or broadcast signals, dedicated voice or data signals, etc. In other words, the other signals represent the collection of signals in addition to the multiplexed signal that are to be transmitted from one or more of the transmit antennas 36.

The particular modulation format and transmit encoding rate selected by the modulator/encoder 60 for modulating and encoding the multiplexed input signal (i.e., the HS-DSCH bit stream) is referred to as the selected "Modulation and Coding Scheme" or "MCS." The selected combination of modulation format and transmit encoding rate changes responsive to changing received signal qualities at the wireless communication devices 12 targeted for reception of the multiplexed signal. More particularly, for channels such as the HS-DSCH where a potentially large number of wireless communication devices 12 (users) are served individually by the channel according to a time-multiplexed schedule, the MCS may be changed for each transmission to each user as a function of the received signal quality feedback from each user.

Thus, changing the MCS responsive to received signal quality feedback is a form of transmit link adaptation, and the control circuit 46 is configured to compensate the MCS selection based on input from the calculation circuit 44, which, directly or indirectly, is based on the variations in stream-specific received signal qualities as measured by the targeted wireless communication device(s) 12. Therefore, the MCS selections made by the transmitter 30 are compensated for the loss in signal quality arising at the targeted wireless communication device(s) 12 because of such variations.

Mathematically, it may be said that the transmit link adaptations of the transceiver node 30 for the multiplexed signal are based on the effective received signal qualities at the targeted wireless communication device(s) 12, which incorporate the effects of stream-specific received signal quality variations. That is, for a given wireless communication device 12, its effective received signal quality, e.g., its effective Signal-to-Interference-plus-Noise Ratio (SINR) typically is a function of two things: (1) the multiple distinct SINRs seen at the device's decoder input because of the different fading paths from each of the transmit antennas 36 being used to transmit the spatially multiplexed signal, and (2) the coding rate and modulation format used for the multiplexed signal, i.e., the selected MCS.

Thus, one definition for the effective received signal quality for a given wireless communication device 12 simply is the average of the stream-specific SINRs appearing at the device's decoder input discounted by a loss factor L≥1. The effective received signal quality thus may be expressed as, $$\gamma_{\mathit{eff}} = \frac{\gamma_{avg}}{L} \qquad 1$$

where the average SINR $\gamma_{avg}$ is given by, $$\gamma_{avg} = \frac{1}{N}\sum_{n=1}^{N}\gamma_n \qquad 2$$

and where the different values of $\gamma_n$ are the N different SINRs seen at the targeted receiver's decoder input. As the spread in SINRs increases, and/or as the transmit coding rate increases, the loss becomes larger. These effects may be seen in the loss curves illustrated in FIG. 3.

Figure 5:
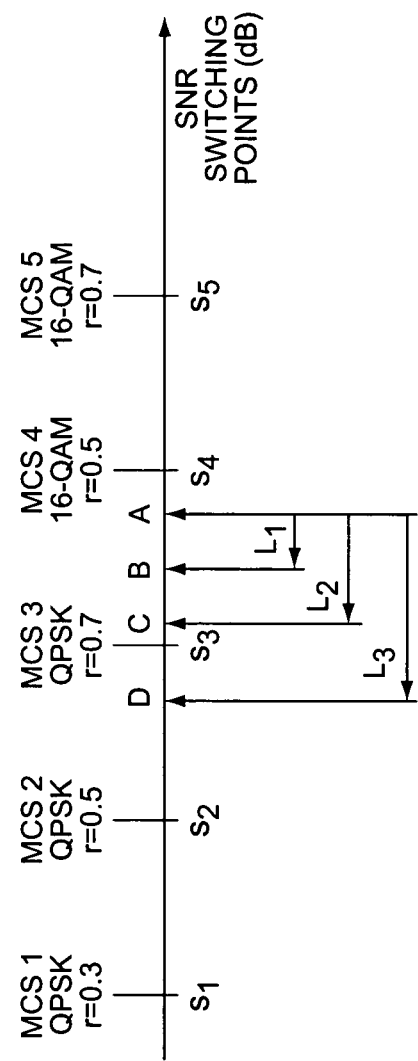
FIG. 5 is a graph of a Modulation-and-Coding-Scheme (MCS) table that may be embodied in memory as look-up table values or function values.

The loss effects may be used to control the MCS selections of the modulator/encoder 60 based on, for example, the MCS selection table illustrated in FIG. 5. The illustrated axis corresponds to received signal quality (e.g., SINR in dB), and the demarcation points on the axis correspond to minimum signal quality points (switching thresholds) for a plurality of different MCSs. For example, s1 corresponds to the minimum signal quality threshold for use of the MCS1, s2 corresponds to the minimum signal quality threshold for the use of MCS2, and so on. In other words, the signal quality must be above the switching threshold s1 to use MCS1, and above the switching threshold s2 to use MCS2, and so on.

For the illustrated example, point A corresponds to a hypothetical uncompensated received signal quality, as reported by the wireless communication device 12. (The signal quality may be reported as a quantized measurement of SINR, e.g., the device 12 may report a "Channel Quality Indicator," commonly referred to as a CQI value.) Point B represents the corresponding effective received signal quality that is obtained by compensating the reported signal quality for a loss L1, corresponding to the use of MCS1. Similarly, point C represents the corresponding effective received signal quality that is obtained by compensating the reported signal quality for a loss L2, corresponding to the use of MCS2, and point D represents the corresponding effective received signal quality that is obtained by compensating the reported signal quality for a loss L3, corresponding to the use of MCS3.

The MCS selection process is therefore compensated for the loss in effective received signal quality experienced at the wireless communication device 12. More particularly, one sees that, in the illustrated example, the effective received signal quality (point B) is above the s1 switching threshold for MCS1. Thus, MCS1 can be selected for use in transmitting the multiplexed signal to the wireless communication device 12. Similarly, the effective received signal quality (point C) is above the s2 switching threshold for MCS2. Thus, MCS2 can be selected for use in transmitting the multiplexed signal to the wireless communication device. However, the effective received signal quality (point D) is below the s3 switching threshold for MCS3. Thus, MCS3 cannot (or should not) be selected. Therefore, the control circuit 46 will instruct the modulator/encoder 60 to use either MCS1 or MCS2, and not MCS3.

In looking further at the illustrated transmitter architecture with the above points in mind, a modulated/encoded version of the HS-DSCH bit stream is output by the modulator/encoder 60, for input to the 1:N demultiplexer 62, which demultiplexes that input signal into N substreams, each substream having a symbol rate of 1/N. The number N is an integer value representing the number of transmit antennas 36 to be used for spatially multiplexing the HS-DSCH signal. Each of the N substreams is spread by a corresponding one of the spreading circuits 64, and input to the antenna selector 66, which selects N of the available M antennas 36 for transmitting the individual substreams of the multiplexed HS-DSCH signal (N≤M). In one or more embodiments, the targeted wireless communication device(s) 12 may provide pilot strength feedback, or other channel feedback, indicating the best transmit antennas for each of one or more spatial multiplexing modes, and the antenna selector 66 may select the particular combination of N transmit antennas 36 based on such feedback.

Of course, the nature of such feedback may be varied according to different embodiments of the methods described herein. In one aspect, such variations generally relate to whether the targeted wireless communication device 12 reflects the variations in stream-specific received signal qualities by feeding back a compensated received signal quality, or whether it feeds back the variations directly, possibly in some parameterized form, such that the transceiver node generates the compensated received signal quality.

Figure 6:
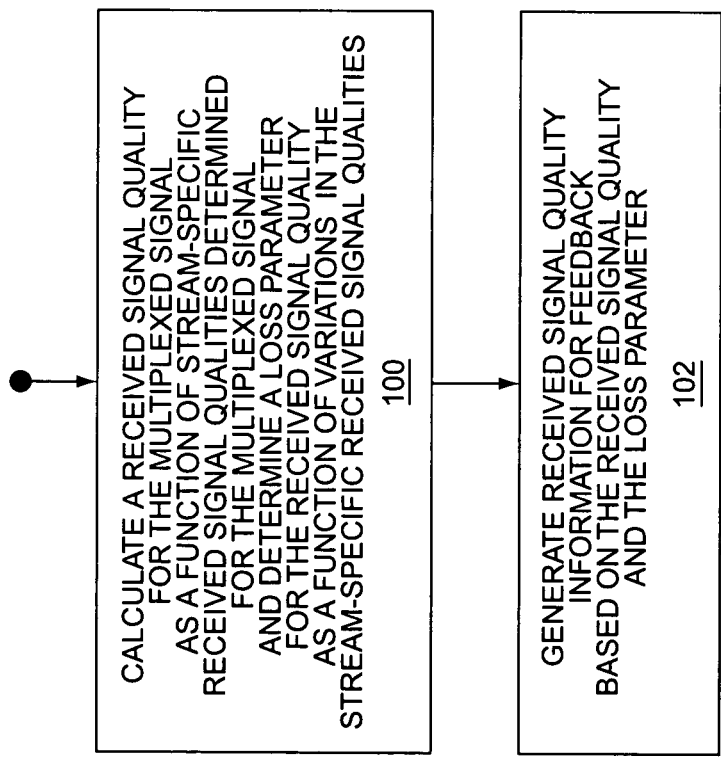

For example, FIG. 6 illustrates one embodiment of processing logic implemented by the wireless communication device 12. In the illustrated embodiment, the calculation circuit 58 is configured to calculate a received signal quality for the multiplexed signal as a function of stream-specific received signal qualities determined for the multiplexed signal and determine a loss parameter for the received signal quality as a function of variations in the stream-specific received signal qualities (Step 100), and generate received signal quality information for feedback based on the received signal quality and the loss parameter (Step 102).

Calculating the received signal quality may comprise calculating a mode-specific received signal quality for each of one or more multiplexing modes defined for the multiplexed signal. As such, determining the loss parameter may comprise determining one or more coding rate-dependent loss parameters as a function of variations in the stream-specific received signal qualities for each mode. In one embodiment, device 12 calculates a Channel Quality Indicator (CQI) value for each of one or more multiplexing modes associated with the multiplexed signal, and determines one or more coding rate-dependent loss parameters for each CQI, such that the received signal quality information comprises mode-specific CQI values and corresponding coding rate-dependent loss parameters.

In cases where the multiplexed signal comprises a spatially multiplexed signal transmitted from a different number of transmit antennas in each of one or more spatial multiplexing modes, the device 12 may calculate a received signal quality for a best set of transmit antennas in each spatial multiplexing mode. Thus, for each multiplexing mode, the device 12 may determine one or more coding rate-dependent loss parameters as a function of variations in the stream-specific received signal qualities for the best set of antennas in that multiplexing mode.

In a specific example, the wireless communication device 12 receives a HS-DSCH signal from the transmitter 30 as a multiplexed signal transmitted as N substreams on N selected transmit antennas 36. Thus, the wireless communication device 12 determines N antenna-specific received signal qualities, based on, for example, using its receiver circuit 52 to measure the SINR of each substream. The wireless communication device 12 may generate N antenna-specific quantizations of the measured SINR, e.g., N CQI values, for feedback to the transmitter 30. Note that the number N changes for each spatial multiplexing mode, and the wireless communication device 12 may be configured to return such information for each available mode. For modes where N=1, i.e., the signal is transmitted from just one of the antennas 36, the variation-related loss value is unity, since there are no SINR variations across multiple antennas.

Figure 7:
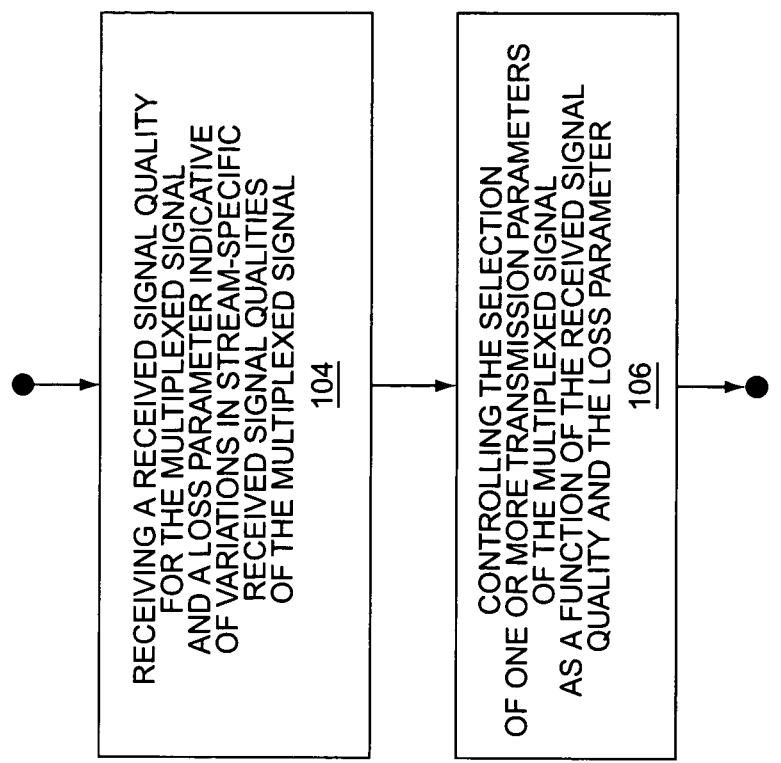
FIGS. 6 and 7 are logic flow diagrams for one embodiment of generating received signal feedback at a remote receiver and responding to such feedback at a corresponding spatial multiplexing transmitter, respectively.

FIG. 7 illustrates complementary processing logic implemented by the transmitter 30 of the transceiver node 20, wherein transmitter 30 includes one or more processing circuits implementing a method of compensating for losses in received signal quality experienced by a receiver receiving a multiplexed signal comprising two or more signal streams. In at least one embodiment, the method comprises receiving a received signal quality for the multiplexed signal and a loss parameter indicative of variations in stream-specific received signal qualities of the multiplexed signal (Step 104), and controlling the selection of one or more transmission parameters of the multiplexed signal as a function of the received signal quality and the loss parameter (Step 106).

The transmitter 30 may receive a received signal quality and a loss parameter for each of one or more multiplexing modes associated with the multiplexed signal, and thus may calculate coding rate-dependent signal quality losses for the multiplexed signal in each multiplexing mode based on the loss parameter received for that multiplexing mode. This information allows the transmitter 30 to identify a highest coding rate supportable in each multiplexing mode based on the coding-rate-dependent signal quality losses calculated for that multiplexing mode, and select a multiplexing mode and coding rate to use for the multiplexed signal based on comparing the highest coding rates between the multiplexing modes. In at least one embodiment, the transmitter 30 uses the coding rate-dependent losses to determine effective received signal qualities for the available coding rates in each multiplexing mode, and compares the effective received signal qualities to signal quality thresholds defined for the different coding rates, to identify the coding rate(s) that can be supported in each mode.

However, regardless of such details, it should be appreciated that the received signal information fed back to the transmitter 30 may comprise mode-specific received signal qualities and corresponding mode-specific loss parameters, for each of one or more multiplexing modes (code and/or spatial multiplexing modes) that are available for transmitting the multiplexed signal. In such embodiments, the mode-specific received signal qualities are calculated as functions of the stream-specific received signal qualities for the multiplexed signal for the corresponding multiplexing modes, and the mode-specific loss parameters indicate the variations in the stream-specific received signal qualities for each multiplexing mode.

As such, the transmitter 30 may determine effective received signal qualities in each multiplexing mode based on the mode-specific received signal quality indicator and a number of coding rate-dependent signal quality losses calculated from the mode-specific loss parameter(s) and coding-rate dependent signal quality loss modeling information. It may then use the effective received signal qualities to select one of the multiplexing modes and coding rates based on comparing the effective received signal qualities to coding-rate dependent signal quality thresholds. For example, the transmitter 30 may adapt the multiplexed signal's transmit link based on identifying the combination of transmit modulation and coding selections having a highest coding rate and having a corresponding minimum received signal quality requirement that is below the effective received signal quality calculated for that combination.

Regardless of the particular feedback format, the transmitter 30 may use effective (compensated) received signal qualities in controlling the one or more transmission parameters of the multiplexed signal. These effective received signal qualities generally are reduced from the apparent received signal quality measured at the remote receiver, as they account for the effective reduction in received signal quality arising at the remote receiver because of the variations. See, e.g., the loss curves of FIG. 3 and the MCS selection line of FIG. 5. Thus, the transmitter 30 may use loss-compensated effective received signal qualities to make the appropriate transmit link adaptations for the spatially transmitted multiplexed signal.

For example, for a multiplexed HS-DSCH signal, the transmitter 30 might receive a CQI value for each of one or more spatial multiplexing modes, along with corresponding variation information for each such mode, reflecting the spread in stream-specific SINR or quantized CQI for each such mode. With such information, the transmitter 30 can be configured to compute an effective CQI for each mode, and use the effective CQI to determine the highest-rate MCS that can be supported at a desired maximum error rate. For example, using a block or bit error rate limit of 10%, the transmitter 30 can determine the highest-rate MCS selection for each spatial multiplexing mode, compare the highest-rate supportable in each mode, and select the best one of them.

Figure 8:
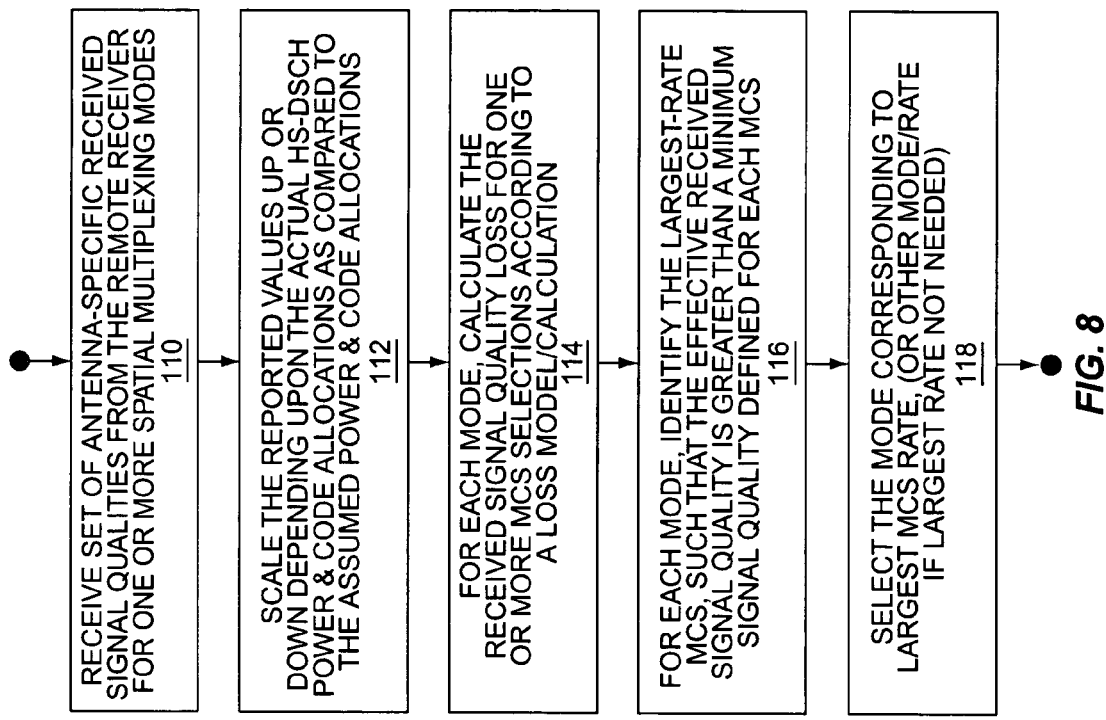
FIG. 8 is a logic flow diagram for an embodiment of transmit link adaptation at a multiplexing transmitter, responsive to a particular form of received signal quality feedback.

FIG. 8 illustrates one embodiment of the above processing logic, wherein the transceiver node 20 receives a set of stream-specific received signal qualities as feedback from a targeted wireless communication device 12 (Step 110). That is, the transmitter 30 of the transceiver node 20 receives feedback in the form of a set of stream-specific received signal quality measurements made by the wireless communication device 12 for each of one or more spatial multiplexing modes. For example, for each of M possible spatial multiplexing modes, for mode "m," there are m distinct SINRs at the wireless communication device 12, resulting in a total of $$\sum_{m=1}^{M} m = \frac{1}{2} M(M+1) \, SINRS$$

for all M modes.

As an optional step, the transmitter 30 may be configured to scale the reported signal qualities to account for differences between the actual transmit power and code allocations that will be made by the transmitter 30 for the multiplexed signal, versus the transmit power and code allocations assumed by the wireless communication device 12 for its received signal quality calculations (Step 112).

That is, the actual received signal quality at the wireless communication device 12 will depend on actual transmit power and code allocations made at the transmitter 30 for the multiplexed signal, which change over time because of changing resource availabilities. The feedback will be "wrong" to the extent that the actual allocations are different from those assumed by the wireless communication device 12, and appropriate scaling up or down by the transmitter 30 can correct the error. Alternatively, the transmitter 30 may be configured to transmit information to the wireless communication device 12 regarding the transmit power and code allocations, such that the wireless communication device 12 has the correct allocation information, thereby obviating the need for feedback scaling by the transmitter 30.

For example, for a spatially multiplexed HS-DSCH signal, the wireless communication device 12 reports a SINR for the nth antenna of a given mode m, which is denoted as $\gamma_n(m)$. Each of these reported SINRs can be scaled up if the assumed allocations are less than the actual allocations, or scaled down if the assumed allocations are greater than the actual allocations.

Continuing with the illustrated processing logic, the transmitter 30 calculates the received signal quality loss for one or more MCS selections in each of one or more spatial multiplexing modes (Step 114). In particular, for the illustrated processing, the calculation circuit 44 of the transmitter 30 is configured to calculate an average SINR across the active transmit antennas 36, for each of the one or more spatial multiplexing modes, based on the reported stream-specific SINRs. This averaging operation may be expressed as, $$\gamma_{avg}(m) = \frac{1}{m}\sum_{n=1}^{m}\gamma_n(m) \qquad 3$$

Then, the transmitter 30 uses an appropriate loss model, e.g., one based on the curves illustrated in FIG. 3, to determine the variation-related loss in received signal quality, for each mode. With the losses thus calculated, the transmitter 30 can determine the effective SINR for each mode, by compensating the average SINR determined for that mode by the corresponding loss.

Thus, one may denote $L_i(m)$ as the SINR loss for the ith entry in a loss table (stored in memory associated with the transmitter 30). Accordingly, the calculation circuit 44 and/or control circuit 46 of the transmitter 30 can be configured to find the largest-rate MCS such that the effective SINR is greater than the switch point (quality threshold) for that MCS, i.e, $\gamma_{avg}(m)/L_i(m) \geq s_i(m)$, where $s_i(m)$ is the signal quality switching point for the ith MCS in a given mode. In general, then, the transmitter 30 is configured to identify the largest-rate MCS in each mode, such that the effective received signal quality, as compensated for SINR loss, is greater than the minimum required signal quality defined for each MCS (Step 116).

With these operations completed, the transmitter 30 is configured to compare the best MCS supportable in each spatial multiplexing mode evaluated, and select the mode having the largest-rate supportable MCS—i.e., select the "best" mode for transmitting the multiplexed signal based on comparing the best MCS supportable in each of the available spatial multiplexing modes (Step 118). Note that if the largest rate MCS is not needed, the transmitter 30 may select another mode and/or rate. For example, if there is insufficient data in a transmit queue at the transmitter 30 for a targeted wireless communication device 12, a non-best mode might be selected, or a lower-rate MCS within the best mode might be used.

Figures 9, 10:
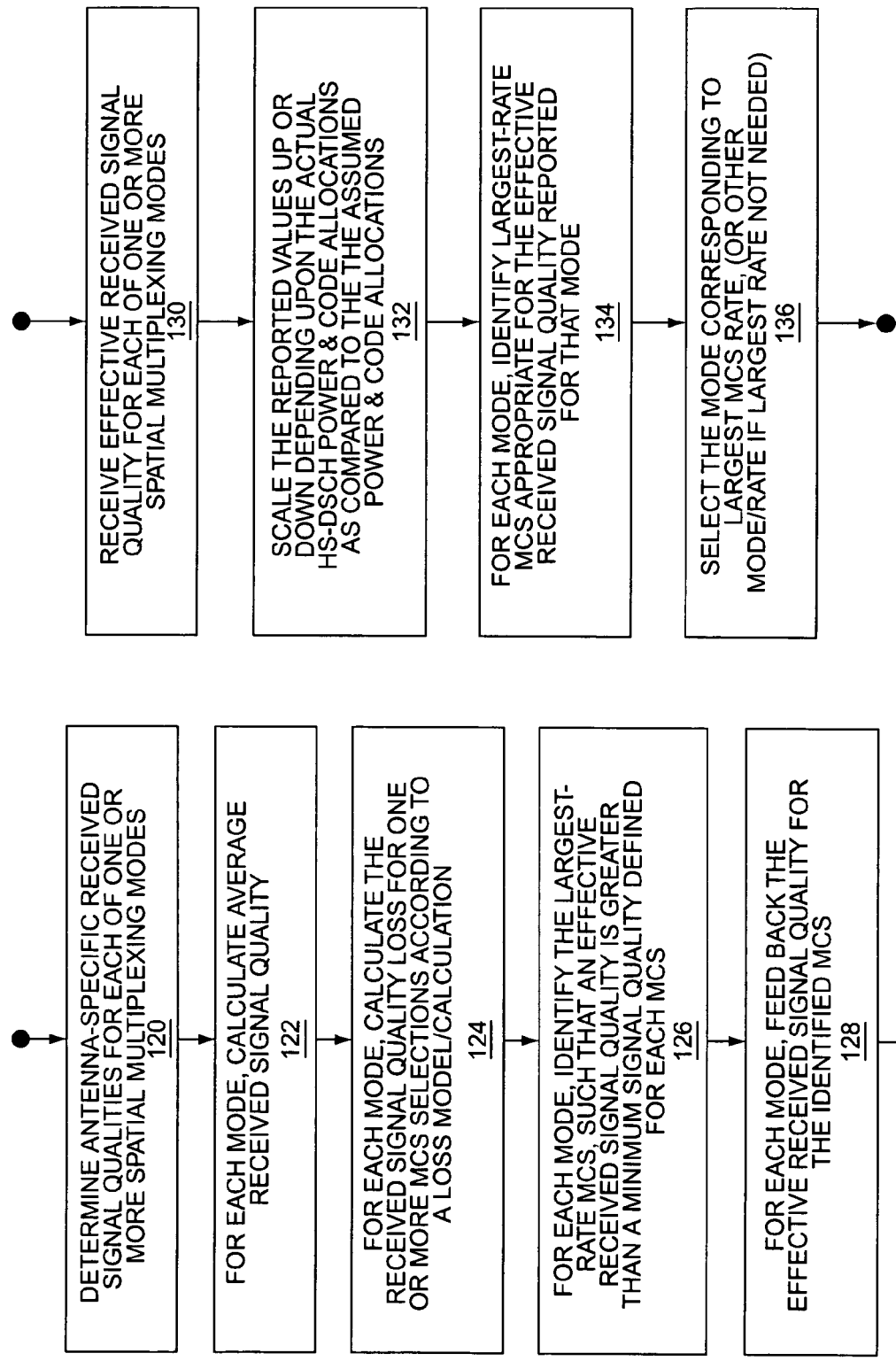
FIGS. 9 and 10 are logic flow diagrams for another embodiment of generating received signal feedback at a remote receiver and responding to such feedback at a corresponding spatial multiplexing transmitter, respectively.

While the embodiment immediately above reflected stream-specific received signal quality variations in the feedback from the wireless communication device 12 by literally returning individualized (stream-specific) quality measurements for each of one or more multiplexing modes, FIG. 9 illustrates an embodiment wherein the feedback still reflects such variations, but does so with a smaller amount of feedback. Reducing the amount of feedback is desirable where reverse link loading is of concern, or simply where the amount of control and signaling overhead is undesirably high.

More particular, FIGS. 9 and 10 illustrate an embodiment of the wireless communication device 12 generating received signal quality feedback (FIG. 9) and the transmitter 30 performing transmit link adaptations responsive to that feedback (FIG. 10). Broadly, the wireless communication device 12 reflects the stream-specific variations in the received signal quality it measures for the multiplexed signal by returning an effective received signal quality. The effective received signal quality may be, for example, the average of the stream-specific received signal qualities scaled by an appropriate loss value.

Thus, the processing of FIG. 9 begins with the wireless communication device 12 determining stream-specific received signal qualities for each of one or more spatial multiplexing modes (Step 120). This may comprise determining distinct SINRs $\{\gamma_n(m)\}_{n=1}^{m}$ for the best antenna selection for each possible mode m=1,2, . . . , M using preconfigured (or agreed upon) nominal transmit power and code allocations.

For each mode, the wireless communication device 12 uses the above stream-specific information to calculate an average received signal quality (Step 122). For example, for each mode, the wireless communication device 12 may compute an average SINR across the particular antennas selected for or corresponding to that mode, i.e., $$\gamma_{avg}(m) = \frac{1}{m}\sum_{n=1}^{m}\gamma_n(m).$$

Further, for each mode, the wireless communication device 12 calculates a received signal quality loss for each of one or more MCS selections available for the mode, according to a loss model or other loss calculation (Step 124). The MCS tables identifying the available MCS selections for each mode generally should be the same as those used by the transmitter 30. An appropriate loss model may comprise one or more look-up tables stored in a memory device including in the wireless communication device 12, with such table (or tables) based on the loss curves illustrated in FIG. 3, for example. Loss calculation also may be based on solving a loss equation that models loss.

In any case, for each mode, the wireless communication device 12 is configured to identify the largest-rate MCS selection available in the mode, such that an effective received signal quality is greater than a minimum signal quality associated with that MCS (Step 126). For example, one may denote $L_i(m)$ as the SINR loss for the ith entry in a loss table for mode m. (Note that for the loss for mode m=1, i.e., $L_i(1)$, is always unity, and thus no loss calculation is required.)

Using this loss notation, the wireless communication device 12 may identify the largest-rate MCS that can be supported in each mode based on, $$\gamma_{\mathit{eff},i}(m) = \frac{\gamma_{avg}(m)}{L_i(m)} \geq s_i(m) \qquad 4$$

where $s_i(m)$ is the switching point—i.e., the signal quality minimum—for the ith MCS in mode m.

With the above operations, the wireless communication device 12 then feeds back for each of the M modes, the effective received signal quality corresponding to the largest-rate MCS identified in Step 126 (Step 128). For example, the wireless communication device 12 can feed back $\gamma_{\mathit{eff},i}(m)$ for each of the M possible spatial multiplexing modes FIG. 10 illustrates complementary processing at the transmitter 30, wherein it receives feedback reflecting the stream-specific variations in received signal quality at the wireless communication device 12 in the form of an effective received signal quality for each of the M possible spatial multiplexing modes (Step 130). Optionally, the transmitter 30 scales the reported values up or down, as needed, to account for any differences between actual transmit power and code allocations at the transmitter 30, versus the allocations assumed by the wireless communication device 12 in its received signal quality computations (Step 132).

Processing continues with the transmitter 30 simply "mapping" the reported effective received signal qualities into a MCS selection table, such as the one used by the wireless communication device 12, to identify the largest-rate MCS that can be supported in each mode (Step 134). The transmitter 30 selects the mode corresponding to the largest-rate MCS that can be supported, or, if such data rates are not needed, it may select a lower-rate MCS from that mode, or from another one of the available modes (Step 136). In any case, transmit link adaptation by the transmitter 30 for the multiplexed signal is compensated for losses arising at the wireless communication device 12 from the variations in stream-specific received signal qualities.

FIGS. 11 and 12 illustrate another embodiment of the wireless communication device 12 generating received signal quality feedback (FIG. 11) and the transmitter 30 performing transmit link adaptations responsive to that feedback (FIG. 12). Processing in FIG. 11 begins with the wireless communication device 12 determining stream-specific received signal qualities for each of one or more spatial multiplexing modes (Step 140). As before, this step may comprise the wireless communication device 12 estimating distinct SINRs for each of the particular transmit antennas 36 used in each of one or more spatial multiplexing modes.

Processing continues with the wireless communication device 12 calculating an average of the received signal qualities and a maximum received signal quality "spread" for each mode (Step 142). The maximum spread for each mode may be calculated as $\Delta m = \max_{n=1}^{m}\{\gamma_n\} - \min_{n=1}^{m}\{\gamma_n\}$ amongst the m individual antenna SINRs for a given mode. The wireless communication device 12 transmits the received signal quality information for each mode back to the transceiver node 20, wherein it is passed along to the transmitter 30 (Step 144).

The feedback information in this context may comprise an average SINR and the maximum SINR spread, which may be expressed by sending the highest and lowest SINRs, or the difference therebetween. Such information may be sent for each mode and it should be noted that characterizing the variations in stream-specific received signal qualities in this manner reduces the amount of feedback from the wireless communication device 12, while still allowing the transmitter 30 to compensate its transmit link adaptations for the losses arising from such variations.

In understanding one embodiment of such compensation by the transmitter 30, by way of non-limiting example, one may assume that M=4 transmit antennas, and the use of spatial multiplexing mode 4 (i.e., the use of all four transmit antennas 36). For such an example, the wireless communication device 12 may return an average SINR value, along with the maximum spread in received signal qualities expressed as the difference between the minimum stream-specific SINR and the maximum stream-specific SINR measured by the wireless communication device 12. Since the middle two SINRs are not fed back to the transmitter 30, i.e., they are "missing" from the feedback, the transmitter 30 cannot uniquely determine the variation-related loss in received signal quality for the wireless communication device 12. However, the transmitter 30 can determine the loss in a probabilistic sense through the use of confidence intervals.

For example, the transmitter 30 may store in its memory a distribution of SINR losses for given SINR spreads, according to one or more different modulation formats and different coding rates, e.g., Quadrature Phase Shift Keying modulation, Quadrature Amplitude Modulation, etc. In making its loss estimation, the transmitter 30 may exploit further statistical characteristics that generally hold for the signal quality loss, such as the fact that the mean and standard deviation of the SINR losses generally increase with coding rate, and also increase with the maximum spread.

Thus, the transmitter 30 may establish a confidence interval that is defined such that the probability that the loss falls in some interval is fixed at a target value, e.g., 90%. Denoting the mean and standard deviation of the loss as $u(r,\Delta)$ and $\sigma(r,\Delta)$ respectively, where r equals the coding rate and $\Delta$ equals the maximum SINR spread, the confidence interval is given by $[0,L_P]$, where $$L_P = \mu(r,\Delta) + f_P(r,\Delta)\sigma(r,\Delta) \qquad 5$$

In the above expression, $f_P(r,\Delta)$ is a multiplier on the standard deviation that is chosen to ensure that the SINR loss falls within the confidence interval with probability P, e.g., P=90%. The multiplier is a function of the SINR spread $\Delta$, the coding rate r, and the modulation type.

The values of $L_P$ may be calculated in advance and stored in a memory table at the transmitter 30. Thus, when the transmitter 30 receives the SINR spread as feedback, it can use the spread and the coding rate for a particular MCS to look-up $L_P$ from the table for a particular mode. That look-up value serves as a bound on the SINR loss for that mode and MCS. The transmitter 30 thus uses the bound in the MCS selection process, rather than using an "exact" loss value, knowing that the actual SINR loss at the wireless communication device 12 rarely will exceed $L_P$.

Alternatively, a single multiplier $F_P$ may be used-independent of the coding rate and the SINR spread—such that the probability is P or greater that the loss falls in the interval $[0,L_{P+}]$, where, $$L_{P+} = \mu(r,\Delta) + F_P\sigma(r,\Delta) \qquad 6$$

For example, use of a fixed multiplier $F_P=1.5$ (slightly greater than an example maximum value of $f_P(r,\Delta)$ in the previously mentioned table of $L_P$ values for given combinations of coding rate and SINR spread, ensures that the SINR loss falls within the confidence interval $[0,L_{P+}]$ with probability 90% or greater. If a fixed multiplier approach is adopted by the transmitter 30, then Eq. 6 can be used to generate the look-up table(s) used by the transmitter 30 for MCS selection.

Thus, with the above example in mind, FIG. 12 steps through an embodiment of transmitter link adaptation based on the transmitter 30 receiving an average signal quality and a corresponding maximum spread, for each of one or more modes (Step 146). The transmitter 30 optionally may scale the feedback information, as described elsewhere herein (Step 148). Any such scaling produces the scale values $\gamma_{avg}(m)$ and $\Delta(m)$ for each spatial multiplexing mode m.

Then, for each mode and each entry in the MCS selection table for that mode, the transmitter 30 looks up the upper bound of the confidence interval for SINR loss from a pre-calculated table stored at the transmitter 30. Denote $L_{P,i}(m)$ (or $L_{P+,i}(m)$ if using the fixed multiplier $F_P$) as the upper bound for the ith entry in the MCS table for mode-m. Note that for mode-1, $L_{P,i}(m)$ or $L_{P+,i}(m)$ are always unity and no look-up needs to be performed. The transmitter 30 then finds the largest-rate MCS such that the lower bound on effective received signal quality (effective SINR) is greater than the switch point for that MCS, i.e., $$\frac{\gamma_{avg}(m)}{L_{P,i}(m)} \geq s_i(m) \qquad 7$$

Where $s_i(m)$ is the switch point for the ith MCS in the MCS selection table of mode m (Steps 150 and 152). The transmitter 30 then selects the mode corresponding to the largest-rate MCS identified in the prior step, or selects a lower-rate MCS in the same mode, or in a different mode, if the largest-rate MCS is not needed (Step 154).

FIGS. 13 and 14 illustrate another embodiment of feedback generation at the wireless communication device 12 (FIG. 13) and corresponding transmit link adaptation at the transmitter 30 (FIG. 14). Broadly, the illustrated processing is based on the wireless communication device 12 feeding back parameterized information that reflects the variations in stream-specific received signal qualities at the wireless communication device 12, for the multiplexed signal in each of one or more spatial multiplexing modes (Step 160).

For each such mode, the wireless communication device 12 generates parameterized received signal quality feedback (Step 162). Such parameterization may build on the above-described maximum spread parameter, or stand as an alternative to that prior method. For example, rather than sending the maximum spread along with an average value, the wireless communication device 12 may be configured to generate and return one or more parameters that characterize the variations in stream-specific received signal quality at the wireless communication device 12 (Step 164).

For example, the wireless communication device 12 may be configured to compute and return an average value and a standard deviation value for the stream-specific received signal qualities, for each of one or more spatial multiplexing modes. Of course, other statistical values, such as variance, etc., can be sent in addition to the standard deviation, or as an alternative to it.

In a similar embodiment, the parameterized feedback may comprise an average value and a "penalty" value. The penalty value could be set such that the loss is fixed at some percentile of the expected losses seen in a typical system. Thus, one or more pre-configured penalty values could be stored in memory at the wireless communication device 12, and the wireless communication device 12 could select an appropriate penalty value for reporting back to the transmitter 30 based on, for example, the spread in stream-specific SINRs measured by the wireless communication device 12 for the spatially multiplexed signal.

Further, the wireless communication device 12 can be configured to define the loss function for use in calculating the penalty value, such that it imparts small penalties at low (average) SINRs. Conversely, the function may produce relatively larger penalties with increasing average SINRs, to reflect the larger losses arising from the higher coding rates that generally are used for the higher signal qualities. In one or more such embodiments, the switching point step sizes in the MCS selection tables used by the transmitter 30 can be increased to limit the impact of loss compensation inaccuracies. That is, the signal quality spans covered by one or more MCS selections in one or more MCS tables can be increased, such that it takes a higher (penalized) signal quality for the next-higher MCS to be selected by the transmitter 30.

In a further embodiment of parameterized feedback, the wireless communication device 12 can be configured to carry out a parameterization of specific loss curves, given vectors of the stream-specific received signal qualities calculated by it, i.e., a vector given as $\{\gamma_1, \gamma_2, \ldots, \gamma_M\}$.

With such embodiments, the wireless communication device 12 can be configured to fit a linear function to a specific loss curve according to certain minimum error criteria. The error minimization criteria could, for example, be defined to conform to the least square principle. Alternatively, the wireless communication device 12 could be configured to fit a (high-order) polynomial to a specific loss curve according to minimum error criteria. The parameterized feedback from the wireless communication device 12 to the transmitter 30 can be reduced to an average received signal quality (e.g., average SINR $\gamma_{avg}$) and the parameter(s) to identify the specific loss function. At the transmitter, the specific loss curve can be reconstructed using the parameter feedback. In this context, a loss curve expresses the expected SINR loss (in dB) as a function of modulation and coding rate.

As an example, the mth parameterized function for four transmit antennas 36 can be defined as a SINR loss curve with $$\{\gamma_1, \gamma_2, \gamma_3, \gamma_4\} = \left\{\gamma_{avg} - \frac{3}{2}\delta_m, \gamma_{avg} - \frac{1}{2}\delta_m, \gamma_{avg} + \frac{1}{2}\delta_m, \gamma_{avg} + \frac{3}{2}\delta_m\right\} \qquad 8$$

Where the resulting value is expressed in dBs, and where $\delta_m$ is a spacing parameter for the function set. The selection of a spacing parameter can be optimized with typical distribution information regarding the SINRs. For 32 spacing values corresponding to 32 different specific loss curves, the wireless communication device 12 can be configured to feedback the average SINR and a 5-bit spacing value, identifying the particular loss curve to be used. With the loss curve thus identified, the transmitter 30 can move along the curve as a function of the coding rate to determine the SINR loss.

The best parameterized function (loss curve) from the set of loss curves defined at the wireless communication device 12 may be chosen according to a least square principle, or it may be chosen to be the lowest-indexed one that is higher than the actual SINR loss curve for all coding rates. Such a criterion guarantees that the SINR loss is never underestimated, at the expense of overestimating loss under some circumstances. The best parameterized function also may be chosen to be the one with the $\delta$ value closest to the averaged spacing of the actual SINR vector. For instance, an actual (sorted) SINR vector for four antennas, and for a given loss curve in dB may be $$\{\gamma_1,\gamma_2,\gamma_3,\gamma_4\}=\{\gamma_{avg}-4.39,\gamma_{avg}-2.94,\gamma_{avg}+2.18,\gamma_{avg}+5.16\} \quad 9$$

The spacings hence are 1.45, 5.12, and 2.98 dB, with an average of 3.18 dB. The average may be compared to a table of δ values for the defined loss curves, and the curve corresponding to the closest δ value in the table may be selected.

Thus, with the above wide ranging possibilities for parameterized feedback in mind, FIG. 14 illustrates a general embodiment of processing operations at the transmitter 30, in which it compensates its transmit link adaptations for the multiplexed signal as a function of the parameterized received signal quality feedback from the wireless communication device 12. Processing thus begins with the transmitter 30 receiving parameterized feedback from the wireless communication device 12 (Step 166), and optionally scaling such information as described elsewhere herein (Step 168).

Then, for each mode, the transmitter 30 determines an effective received signal quality based on the parameterized information (Step 160). For example, the transmitter 30 scales or otherwise reduces the average SINR value received for a given mode for MCS-specific loss values determined for that mode based on the parameterized feedback (Step 170). The transmitter 30 then identifies the largest-rate MCS that can be supported by the corresponding effective received signal quality in each mode (Step 172), and then selects the mode corresponding to the largest-rate MCS, or makes another selection if the largest-rate MCS is not needed (Step 174).

From the number of above-described embodiments, which among other things illustrates some of the variations in processing at the wireless communication device 12 and the transmitter 30, those skilled in the art will appreciate that the present invention broadly provides methods and apparatus for improving transmit link adaptations for multiplexed signals, by providing feedback that reflects the variations in stream-specific received signal quality for the multiplexed signal at one or more remote receivers. The feedback may directly convey the variations, or indirectly convey information regarding the variations, such as by providing parameterized data, or by providing compensated, effective signal quality values.

Further, without regard to the feedback particulars, those skilled in the art will readily appreciate that the methods taught herein broadly apply to a range of multiplexing transmissions systems, including spatial, code, and frequency multiplexing transmission systems. Broadly, the signal quality loss compensation methods taught herein may be applied essentially to any multiplexing transmission system wherein multiple subchannels with different SINRs are used to transmit information to a receiver. That is, the methods taught herein directly apply across the range of these different multiplexing methods, and to combinations of these methods, such as where code and spatial multiplexing are combined. As such, the case where multiple transmit antennas are used can be considered as a special case of multiplexing.

Thus, the methods of signal quality loss compensation taught herein apply to Orthogonal Frequency Division Multiplexing (OFDM) transmissions, wherein multiple subchannels with different SINRs used to transmit information to a receiver. More particularly, a common embodiment of an OFDM-based multiplexing transmission system assigns multiple frequency subchannels to each user. With frequency-selective fading, the received signal quality on each of these subchannels can vary widely, and the methods taught herein thus can be used to determine an effective signal quality, wherein the effective signal quality reflects a signal quality loss arising from variations in the substream signal qualities.

As another example, the methods taught herein may be applied to transmission systems based on the Global Standard for Mobile communications (GSM), at least for certain transmission cases in such systems. More particularly, information may be sent over a GSM channel based on using different timeslots and hopping over multiple frequencies. In such cases, the GSM channel is a type of the multiple-state channels to which the signal quality loss compensation methods taught herein are applied.

Thus, those skilled in the art will appreciate that a multiplexing transmitter, whether based on spatial multiplexing, code multiplexing (e.g., multi-coded information substreams), frequency multiplexing, or any combination thereof, can improve its transmit link adaptations for a multiplexed transmit signal by compensating those adaptations for losses in received signal quality arising from received signal quality variations in the different multiplex streams. With this point in mind, then, it should be understood that the present invention is not limited by the foregoing description, nor is it limited by the accompanying drawings. Instead, the present invention is limited only by the following claims, and their legal equivalents.

What is claimed is:

1. A method of feeding back received signal quality information, the method comprising:

receiving, at a receiver, a multiplexed signal including two or more signal streams;

calculating, at the receiver, a received signal quality for the multiplexed signal as a function of two or more different stream-specific received signal qualities determined for the multiplexed signal;

determining, at the receiver, a loss parameter that represents a loss in the received signal quality for the multiplexed signal arising from the two or more different stream-specific received signal qualities, wherein the determined loss parameter is useable to compensate the calculated received signal quality for the loss;

generating, at the receiver, received signal quality information including the calculated received signal quality, or a quantized version thereof, and the loss parameter; and transmitting, from the receiver, the received signal quality information as feedback, wherein determining the loss parameter comprises expressing effective losses in the received signal quality arising from the two or more different stream-specific received signal qualities as loss functions of multiplexed signal coding rate and generating the loss parameter as a set of parameters corresponding to a best-fitting one of the loss functions.

2. The method of claim 1, wherein calculating the received signal quality comprises calculating a mode-specific received signal quality for each of one or more multiplexing modes defined for the multiplexed signal.

3. The method of claim 2, wherein determining the loss parameter comprises, for each mode-specific received signal quality, determining one or more coding rate-dependent loss parameters.

4. The method of claim 1, wherein calculating the received signal quality comprises calculating a Channel Quality Indicator (CQI) value for each of one or more multiplexing modes associated with the multiplexed signal, and wherein determining the loss parameter comprises determining one or more coding rate-dependent loss parameters for each CQI, such that the received signal quality information comprises mode-specific CQI values and corresponding coding rate-dependent loss parameters.

5. The method of claim 1, wherein the multiplexed signal comprises a spatially multiplexed signal transmitted from a different number of transmit antennas in each of one or more spatial multiplexing modes, and wherein calculating the received signal quality comprises calculating a received signal quality for a best set of transmit antennas in each spatial multiplexing mode.

6. The method of claim 5, wherein determining the loss parameter comprises, for each spatial multiplexing mode, determining one or more coding rate-dependent loss parameters.

7. The method of claim 1, wherein calculating the received signal quality comprises calculating an average signal quality from the stream-specific received signal qualities.

8. The method of claim 7, wherein determining the loss parameter comprises determining a maximum spread of the stream-specific signal qualities, such that the received signal quality information indicates the average received signal quality and the maximum spread.

9. The method of claim 7, wherein determining the loss parameter comprises determining a variation statistic characterizing variations between the stream-specific signal qualities, such that the received signal quality information indicates the average received signal quality and the variation statistic.

10. The method of claim 9, wherein the variation statistic comprises one or more of a variance of the stream-specific received signal qualities, a standard deviation of the stream-specific received signal qualities, and a maximum spread of the stream-specific received signal qualities.

11. The method of claim 1, wherein determining the loss parameter comprises determining a loss value representing an effective reduction in the received signal quality arising from the two or more different stream-specific received signal qualities.

12. The method of claim 11, wherein determining the loss value comprises determining the loss value from a loss equation or data table maintained at the receiver that models signal quality loss as one or more coding rate-dependent functions of the received signal quality of the multiplexed signal.

13. The method of claim 1, wherein calculating the received signal quality comprises determining a set of best transmit antennas for each of one or more spatial multiplexing modes associated with the multiplexed signal, and calculating a channel quality indicator value for each spatial multiplexing mode based on the stream-specific received signal qualities of the multiplexed signal corresponding to the best set of transmit antennas.

14. The method of claim 13, wherein determining the loss parameter comprises determining one or more loss parameters for each spatial multiplexing mode using the stream-specific received signal qualities corresponding to the best set of antennas for that spatial multiplexing mode, and wherein generating the received signal quality information comprises generating the received signal quality information as channel quality indicators and corresponding loss parameters calculated for the spatial multiplexing modes.

15. The method of claim 1, wherein the receiver comprises a Wideband Code Division Multiple Access (W-CDMA) receiver, and wherein the multiplexed signal comprises a spatially multiplexed High Speed Downlink Shared Channel (HS-DSCH) signal, and wherein the received signal quality information comprises a Channel Quality Indicator (CQI) value and one or more coding rate-dependent loss parameters, for each of one or more spatial multiplexing modes associated with the spatially multiplexed HS-DSCH signal.

16. A method of compensating for losses in received signal quality experienced by a receiver, the method comprising:
transmitting, from a transmitter, a multiplexed signal including two or more signal streams;
receiving, at the transmitter, received signal quality information as feedback from the receiver, the received signal quality information including a received signal quality for the multiplexed signal, or a quantized version thereof, and a loss parameter that represents a loss in the received signal quality for the multiplexed signal arising from two or more different stream-specific received signal qualities of the multiplexed signal, wherein the loss parameter is useable to compensate the received signal quality for the loss; and
controlling, at the transmitter, the selection of one or more transmission parameters of the multiplexed signal based on the received signal quality and the loss parameter,
wherein the loss parameter expresses effective losses in the received signal quality arising from the two or more different stream-specific received signal qualities as loss functions of multiplexed signal coding rate and includes a set of parameters corresponding to a best-fitting one of the loss functions.

17. The method of claim 16, wherein receiving the signal quality information comprises receiving a received signal quality and a loss parameter for each of one or more multiplexing modes associated with the multiplexed signal.

18. The method of claim 17, wherein controlling the selection of the one or more transmission parameters comprises:
calculating coding rate-dependent signal quality losses for the multiplexed signal in each multiplexing mode based on the loss parameter received for that multiplexing mode;
identifying a highest coding rate supportable in each multiplexing mode based on the coding-rate-dependent signal quality losses calculated for that multiplexing mode; and
selecting a multiplexing mode and coding rate to use for the multiplexed signal based on comparing the highest coding rates between the multiplexing modes.

19. The method of claim 16, wherein receiving the signal quality information comprises receiving mode-specific received signal qualities and corresponding mode-specific loss parameters for each of one or more multiplexing modes associated with the multiplexed signal.

20. The method of claim 19, wherein each mode-specific received signal quality comprises a received signal quality indicator calculated as a function of the stream-specific received signal qualities for the multiplexed signal for the corresponding multiplexing mode, and wherein each corresponding loss parameter indicates a difference between those stream-specific received signal qualities.

21. The method of claim 20, wherein controlling the selection of the one or more transmission parameters comprises determining effective received signal qualities in each multiplexing mode based on the mode-specific received signal quality indicator and a number of coding rate-dependent signal quality losses calculated from the mode-specific loss parameter and coding-rate dependent signal quality loss modeling information, and selecting one of the multiplexing modes and coding rates based on comparing the effective received signal qualities to coding-rate dependent signal quality thresholds.

22. The method of claim 16, wherein the loss parameter comprises a statistical value indicating variations between the stream-specific received signal qualities, and wherein controlling the selection of the one or more transmission parameters comprises calculating a loss value from the loss parameter, calculating an effective received signal quality from the loss value and the received signal quality, and controlling the selection of the one or more transmission parameters based on the effective received signal quality.

23. The method of claim 22, wherein the statistical value comprises a maximum spread of the stream-specific received signal qualities, a standard deviation of the stream-specific received signal qualities, or a variance of the stream-specific received signal qualities.

24. The method of claim 16, wherein the loss functions model signal quality losses as a function of different stream-specific received signal qualities, and wherein controlling the selection of the one or more transmission parameters comprises calculating a loss value from an identified loss curve or function, calculating an effective received signal quality from the loss value and the received signal quality, and controlling the selection of the one or more transmission parameters based on the effective received signal quality.

25. A multiplexing transmitter for use in a wireless communication network comprising:
radio transmission circuits configured to transmit a multiplexed signal including two or more signal streams from the multiplexing transmitter to a receiver;
one or more interface circuits configured to receive signal quality information as feedback from a receiver, the received signal quality information including a received signal quality for the multiplexed signal, or a quantized version thereof, and a loss parameter that represents a loss in the received signal quality for the multiplexed signal arising from two or more different stream-specific received signal qualities of the multiplexed signal, wherein the loss parameter is useable to compensate the received signal quality for the loss; and
a control circuit configured to control the selection of one or more transmission parameters of the multiplexed signal based on the received signal quality and the loss parameter,
wherein the loss parameter expresses effective losses in the received signal quality arising from the two or more different stream-specific received signal qualities as loss functions of multiplexed signal coding rate and includes a set of parameters corresponding to a best-fitting one of the loss functions.

26. The multiplexing transmitter of claim 25, wherein the control circuit includes or is associated with a calculation circuit that is configured to determine an effective received signal quality based on estimating a loss in the received signal quality arising at the receiver from the two or more different stream-specific received signal qualities of the multiplexed signal.

27. The multiplexing transmitter of claim 25, wherein the received signal quality and the loss parameter comprise a received signal quality and a loss parameter for each of one or more multiplexing modes associated with the multiplexed signal.

28. The multiplexing transmitter of claim 27, wherein the control circuit is configured to control the selection of the one or more transmission parameters by:
calculating coding rate-dependent signal quality losses for the multiplexed signal in each multiplexing mode based on the loss parameter received for that multiplexing mode;
identifying a highest coding rate supportable in each multiplexing mode based on the coding-rate-dependent signal quality losses calculated for that multiplexing mode; and
selecting a multiplexing mode and coding rate to use for the multiplexed signal based on comparing the highest coding rates between the multiplexing modes.

29. The multiplexing transmitter of claim 25, wherein the received signal quality and the loss parameter comprise mode-specific received signal qualities and corresponding mode-specific loss parameters for each of one or more multiplexing modes associated with the multiplexed signal.

30. The multiplexing transmitter of claim 29, wherein each mode-specific received signal quality comprises a received signal quality indicator calculated as a function of the stream-specific received signal qualities for the multiplexed signal for the corresponding multiplexing mode, and wherein each corresponding loss parameter indicates a difference between the stream-specific received signal qualities.

31. The multiplexing transmitter of claim 30, wherein the control circuit is configured to control the selection of the one or more transmission parameters by determining effective received signal qualities in each multiplexing mode based on the mode-specific received signal quality indicator and a number of coding rate-dependent signal quality losses calculated from the mode-specific loss parameter and coding-rate dependent signal quality loss modeling information, and selecting one of the multiplexing modes and coding rates based on comparing the effective received signal qualities to coding-rate dependent signal quality thresholds.

32. The multiplexing transmitter of claim 25, wherein the loss parameter comprises a statistical value indicating variations between the stream-specific received signal qualities, and wherein the control circuit is configured to control the selection of the one or more transmission parameters by calculating a loss value from the loss parameter, calculating an effective received signal quality from the loss value and the received signal quality, and controlling the selection of the one or more transmission parameters based on the effective received signal quality.

33. The multiplexing transmitter of claim 32, wherein the statistical value comprises a maximum spread of the stream-specific received signal qualities, a standard deviation of the stream-specific received signal qualities, or a variance of the stream-specific received signal qualities.

34. The multiplexing transmitter of claim 25, wherein the loss functions model signal quality losses as a function of variations between the stream-specific received signal qualities, and wherein the control circuit is configured to control the selection of the one or more transmission parameters by calculating a loss value from an identified loss curve or function, calculating an effective received signal quality from the loss value and the received signal quality, and controlling the selection of the one or more transmission parameters based on the effective received signal quality.

35. A wireless communication receiver comprising one or more processing circuits configured to:
receive a multiplexed signal including two or more signal streams;
calculate a received signal quality for the multiplexed signal as a function of two or more different stream-specific received signal qualities determined for the multiplexed signal;
determine a loss parameter that represents a loss in the received signal quality for the multiplexed signal arising from the two or more different stream-specific received signal qualities, wherein the determined loss parameter is useable to compensate the calculated received signal quality for the loss;

generate received signal quality information including the calculated received signal quality, or a quantized version thereof, and the loss parameter; and transmit the received signal quality information as feedback, wherein the one or more processing circuits are configured to determine the loss parameter by expressing effective losses in the received signal quality arising from the two or more different stream-specific received signal qualities as loss functions of multiplexed signal coding rate and generating the loss parameter as a set of parameters corresponding to a best-fitting one of the loss functions.

36. The receiver of claim 35, wherein the one or more processing circuits are configured to calculate the received signal quality as a mode-specific received signal quality for each of one or more multiplexing modes defined for the multiplexed signal.

37. The receiver of claim 36, wherein the one or more processing circuits are configured to determine the loss parameter as one or more coding rate-dependent loss parameters for each mode-specific received signal quality, based on the two or more different stream-specific received signal qualities of the multiplexed signal in the corresponding multiplexing mode.

38. The receiver of claim 37, wherein the multiplexed signal comprises a spatially multiplexed signal transmitted from a different number of transmit antennas in each multiplexing mode, and wherein the one or more processing circuits are configured to calculate the mode-specific received signal qualities by calculating the received signal quality for a best set of transmit antennas in each multiplexing mode.

39. The receiver of claim 35, wherein the one or more processing circuits are configured to calculate the received signal quality by calculating an average signal quality from the two or more different stream-specific received signal qualities.

40. The receiver of claim 39, wherein the one or more processing circuits are configured to determine the loss parameter by determining a maximum spread of the variations between the stream-specific signal qualities, such that the received signal quality information indicates the average received signal quality and the maximum spread.

41. The receiver of claim 39, wherein the one or more processing circuits are configured to determine the loss parameter by determining a variation statistic characterizing variations between the stream-specific received signal qualities, such that the received signal quality information indicates the average received signal quality and the variation statistic.

42. The receiver of claim 35, wherein the one or more processing circuits are configured to determine the loss parameter by determining a loss value representing an effective reduction in the received signal quality arising because of the two or more different stream-specific received signal qualities.

43. The receiver of claim 42, wherein the one or more processing circuits are configured to determine the loss value by determining the loss value from a loss equation or data table maintained at the receiver that models signal quality loss as one or more coding rate-dependent functions of the received signal quality of the multiplexed signal.

44. The receiver of claim 35, wherein the one or more processing circuits are configured to determine the loss parameter by determining a set of best transmit antennas for each of one or more spatial multiplexing modes associated with the multiplexed signal, and determining a loss parameter for each spatial multiplexing mode using the stream-specific received signal qualities corresponding to a best set of antennas for that spatial multiplexing mode.

45. The receiver of claim 44, wherein the one or more processing circuits are configured to generate the received signal quality information as individual channel quality indicators corresponding to respective ones of the best transmit antennas for each spatial multiplexing mode, and as corresponding loss parameters for each spatial multiplexing mode.

46. The receiver of claim 35, wherein the receiver comprises a Wideband Code Division Multiple Access (W-CDMA) receiver, and wherein the multiplexed signal comprises a spatially multiplexed High Speed Downlink Shared Channel (HS-DSCH) signal, and wherein the received signal quality information comprises a Channel Quality Indicator (CQI) value and one or more coding rate-dependent loss parameters, for each of one or more spatial multiplexing modes associated with the spatially multiplexed HS-DSCH signal.

47. The receiver of claim 35, wherein the one or more processing circuits are configured to calculate the received signal quality by calculating a Channel Quality Indicator (CQI) value for each of one or more multiplexing modes associated with the multiplexed signal, and wherein determining the loss parameter comprises determining one or more coding rate-dependent loss parameters for each CQI, such that the received signal quality information comprises mode-specific CQI values and corresponding coding rate-dependent loss parameters.

48. The receiver of claim 38, wherein the one or more processing circuits are configured to determine the loss parameter, for each spatial multiplexing mode, by determining one or more coding rate-dependent loss parameters.

49. The receiver of claim 41, wherein the variation statistic comprises one or more of a variance of the stream-specific received signal qualities, a standard deviation of the stream-specific received signal qualities, and a maximum spread of the stream-specific received signal qualities.

50. The receiver of claim 38, wherein the one or more processing circuits are configured to determine the loss parameter by determining one or more loss parameters for each spatial multiplexing mode using the stream-specific received signal qualities corresponding to the best set of antennas for that spatial multiplexing mode, and wherein generating the received signal quality information comprises generating the received signal quality information as a channel quality indicator and corresponding loss parameters calculated for that spatial multiplexing mode.

51. The method of claim 16, comprising determining an effective received signal quality based on estimating a loss in the received signal quality arising at the receiver from the two or more different stream-specific received signal qualities of the multiplexed signal.

* * * * *

UNITED STATES PATENT AND TRADEMARK OFFICE
CERTIFICATE OF CORRECTION

PATENT NO. : 9,130,706 B2
APPLICATION NO. : 11/138724
DATED : September 8, 2015
INVENTOR(S) : Grant et al.

It is certified that error appears in the above-identified patent and that said Letters Patent is hereby corrected as shown below:

ON THE TITLE PAGE

Item (56), under "OTHER PUBLICATIONS", in Column 2, Line 2, delete "Broadcastr" and insert -- Broadcast --, therefor.

Item (56), under "OTHER PUBLICATIONS", in Column 2, Line 9, delete "Journal" and insert -- Journal --, therefor.

Item (56), under "OTHER PUBLICATIONS", in Column 2, Line 13, delete "Pacet" and insert -- Packet --, therefor.

IN THE DRAWINGS

Fig. 10, Sheet 6 of 8, in Step "132", in Line 4, delete "TO THE THE" and insert -- TO THE --, therefor.

Fig. 12, Sheet 7 of 8, in Step "148", in Line 4, delete "TO THE THE" and insert -- TO THE --, therefor.

Fig. 14, Sheet 8 of 8, in Step "168", in Line 4, delete "TO THE THE" and insert -- TO THE --, therefor.

IN THE SPECIFICATION

Column 10, Line 60, delete "SINRS" and insert -- SINRs --, therefor.

Column 13, Line 17, delete "modes" and insert -- modes. --, therefor.

Column 14, Line 62, delete "(slightly" and insert -- slightly --, therefor.

Signed and Sealed this
Twenty-third Day of February, 2016

Michelle K. Lee
*Director of the United States Patent and Trademark Office*

Column 15, Line 17, delete "$L_{P+i}(m)$" and insert -- $L_{P+,i}(m)$ --, therefor.

Column 15, Line 28, delete "Where" and insert -- where --, therefor.

Column 16, Line 48, delete "Where" and insert -- where --, therefor.

IN THE CLAIMS

Column 19, Line 58, in Claim 14, delete "as channel" and insert -- as the channel --, therefor.